United States Patent
Green, III et al.

(10) Patent No.: US 11,188,446 B2
(45) Date of Patent: Nov. 30, 2021

(54) SYSTEM AND METHOD FOR PROVIDING AUDIO PROCESSING AND INVENTORY TRACKING AND MANAGEMENT IN A CLOUD ENVIRONMENT

(71) Applicant: ALTEROS, INC., Stow, OH (US)

(72) Inventors: Robert T. Green, III, Streetsboro, OH (US); Brian K. Fair, Boyds, MD (US); Jacquelynn A. Green, Streetsboro, OH (US)

(73) Assignee: ALTEROS, INC., Stow, OH (US)

( * ) Notice: Subject to any disclaimer, the term of this patent is extended or adjusted under 35 U.S.C. 154(b) by 56 days.

(21) Appl. No.: 16/403,299

(22) Filed: May 3, 2019

(65) Prior Publication Data

US 2019/0340098 A1    Nov. 7, 2019

Related U.S. Application Data

(60) Provisional application No. 62/666,607, filed on May 3, 2018.

(51) Int. Cl.
| | | |
|---|---|---|
| *G06F 11/34* | (2006.01) | |
| *H04L 29/08* | (2006.01) | |
| *H04L 12/24* | (2006.01) | |
| *G06F 11/30* | (2006.01) | |
| *G06Q 10/08* | (2012.01) | |
| *G06Q 30/04* | (2012.01) | |

(52) U.S. Cl.
CPC ...... *G06F 11/3495* (2013.01); *G06F 11/3006* (2013.01); *G06F 11/3065* (2013.01); *G06Q 10/087* (2013.01); *G06Q 30/04* (2013.01); *H04L 41/082* (2013.01); *H04L 67/10* (2013.01); *H04L 67/34* (2013.01)

(58) Field of Classification Search
CPC ............. G06F 11/3495; G06F 11/3006; G06F 11/3065; G06Q 10/087; G06Q 30/04; H04L 67/34; H04L 67/10; H04L 41/082
See application file for complete search history.

(56) References Cited

U.S. PATENT DOCUMENTS

| | | | | |
|---|---|---|---|---|
| 2012/0213212 A1* | 8/2012 | Moore | ............... | H04N 21/4334 370/338 |
| 2012/0311135 A1* | 12/2012 | DeLuca | ............... | G06F 9/44505 709/224 |
| 2013/0246179 A1* | 9/2013 | Shrock | ................... | G06Q 30/00 705/14.58 |
| 2017/0243263 A1* | 8/2017 | Vedala | ................... | G06Q 20/14 |

(Continued)

OTHER PUBLICATIONS

Laprade, Expert 365, Sep. 2017, Springer (Year: 2017).*

*Primary Examiner* — John A Follansbee
*Assistant Examiner* — Fadi Haj Said
(74) *Attorney, Agent, or Firm* — Sherman IP LLP; Kenneth L. Sherman; Hemavathy Perumal

(57) ABSTRACT

One embodiment provides a method for inventory tracking and management in a cloud environment. The method comprises maintaining a plurality of on demand computing resources in the cloud environment. The computing resources include one or more cloud applications. The method further comprises creating a job-specific device by flexibly configuring an end user device connected to the cloud environment to execute a specific job, and tracking and managing usage of the job-specific device utilizing at least one of the computing resources.

18 Claims, 9 Drawing Sheets

(56) References Cited

U.S. PATENT DOCUMENTS

2018/0048532 A1* 2/2018 Poort ...................... H04L 47/70
2018/0152311 A1* 5/2018 Ansari ............. G08B 13/19656
2020/0005664 A1* 1/2020 Kim ....................... G09B 15/00

* cited by examiner

SYSTEM AND METHOD FOR PROVIDING AUDIO PROCESSING AND INVENTORY TRACKING AND MANAGEMENT IN A CLOUD ENVIRONMENT

CROSS REFERENCE TO RELATED APPLICATIONS

This application claims priority from U.S. Provisional Patent Application Ser. No. 62/666,607, filed on May 3, 2018, incorporated herein by reference.

TECHNICAL FIELD

One or more embodiments relate generally to cloud computing, and in particular, a system and method for providing audio processing and inventory tracking and management in a cloud environment.

BACKGROUND

A cloud environment provides a shared pool of computing resources (e.g., networks, network bandwidth, servers, processing, memory, storage, applications virtual machines, services, licenses, etc.) available on demand for consumption by one or more users.

SUMMARY

One embodiment provides a method for inventory tracking and management in a cloud environment. The method comprises maintaining a plurality of on demand computing resources in the cloud environment. The computing resources include one or more cloud applications. The method further comprises creating a job-specific device by flexibly configuring an end user device connected to the cloud environment to execute a specific job, and tracking and managing usage of the job-specific device utilizing at least one of the computing resources.

Another embodiment provides a system for inventory tracking and management in a cloud environment. The system comprises a plurality of on demand computing resources maintained in the cloud environment. The computing resources include one or more cloud applications. The system further comprises at least one processor and a non-transitory processor-readable memory device storing instructions that when executed by the at least one processor causes the at least one processor to perform operations. The operations include creating a job-specific device by flexibly configuring an end user device connected to the cloud environment to execute a specific job, and tracking and managing usage of the job-specific device utilizing at least one of the computing resources.

One embodiment provides a method for flexible device configuration in a cloud environment. The method comprises maintaining a plurality of on demand computing resources in the cloud environment. The computing resources include one or more cloud applications. The method further comprises creating a job-specific device by flexibly configuring, via the one or more cloud applications, an end user device connected to the cloud environment to execute a specific job, and monitoring, recording, and reporting, via the one or more cloud applications, usage time of the job-specific device.

These and other features, aspects and advantages of the present invention will become understood with reference to the following description, appended claims and accompanying figures.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention together with advantages and features, by way of example with reference to the drawings.

DETAILED DESCRIPTION

One or more embodiments relate generally to cloud computing, and in particular, a system and method for providing audio processing and inventory tracking and management in a cloud environment. One embodiment provides a method for inventory tracking and management in a cloud environment. The method comprises maintaining a plurality of on demand computing resources in the cloud environment. The computing resources include one or more cloud applications. The method further comprises creating a job-specific device by flexibly configuring an end user device connected to the cloud environment to execute a specific job, and tracking and managing usage of the job-specific device utilizing at least one of the computing resources.

Another embodiment provides a system for inventory tracking and management in a cloud environment. The system comprises a plurality of on demand computing resources maintained in the cloud environment. The computing resources include one or more cloud applications. The system further comprises at least one processor and a non-transitory processor-readable memory device storing instructions that when executed by the at least one processor causes the at least one processor to perform operations. The operations include creating a job-specific device by flexibly configuring an end user device connected to the cloud environment to execute a specific job, and tracking and managing usage of the job-specific device utilizing at least one of the computing resources.

One embodiment provides a method for flexible device configuration in a cloud environment. The method comprises maintaining a plurality of on demand computing resources in the cloud environment. The computing resources include one or more cloud applications. The method further comprises creating a job-specific device by flexibly configuring, via the one or more cloud applications, an end user device connected to the cloud environment to execute a specific job, and monitoring, recording, and reporting, via the one or more cloud applications, usage time of the job-specific device.

Figure 1:
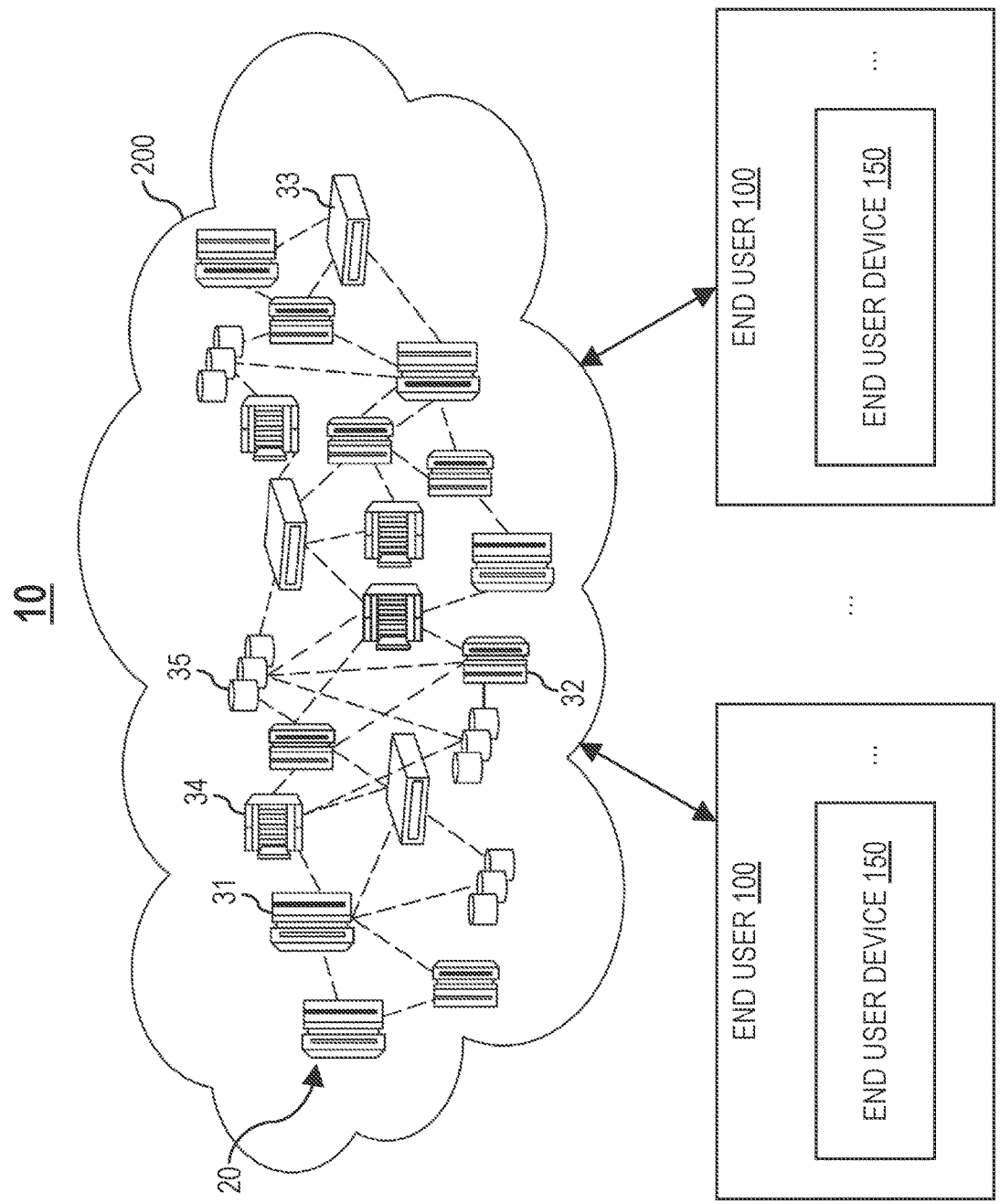
FIG. 1 illustrates an example computing architecture for providing audio processing and inventory tracking and management in a cloud environment, in accordance with one embodiment.

FIG. 1 illustrates an example computing architecture 10 for providing audio processing and inventory tracking and management in a cloud environment 200, in accordance with one embodiment. The cloud environment 200 provides an underlying cloud infrastructure comprising a plurality of computing nodes 20. The computing nodes 20 provide a shared pool of configurable computing resources available for consumption by one or more end users 100. As described in detail later herein, the computing resources include memory, network bandwidth, processing, and storage. The cloud environment 200 provides the one or more end users 100 with convenient, on-demand network access to the computing resources, removing the need for each end user 100 to maintain local computing resources.

In one embodiment, the computing nodes 20 communicate with one another. For example, in one embodiment, the computing nodes 20 are grouped physically or virtually, in one or more interconnected networks.

In one embodiment, the one or more end users 100 include, but are not limited to, at least one of the following: a broadcaster operating a broadcast system (e.g., a radio broadcaster, a TV broadcaster, etc.), a recording studio (i.e., a facility for sound recording, mixing, and audio production), a facility for audio post production, etc.

The cloud environment 200 provides one or more cloud applications/services running on the cloud infrastructure. In one embodiment, the one or more cloud applications/services include, but are not limited to, at least one of the following: audio processing, inventory tracking and management of professional audio equipment including tools and workflow solutions for facilitating distribution of licenses for the equipment and monetization of the equipment, for flexible configuration of one or more devices/system components to create/configure one or more job-specific or application-specific devices/system components that are necessary/required to perform/fulfill a specific job or application (e.g., a particular audio project), for monitoring, recording, and reporting usage time of one or more job-specific or application-specific devices/system components that have been flexibly configured, etc. Each cloud application/service is accessible from an end user device 150 of an end user 100.

The cloud environment 200 provides infrastructure, platforms, and software as services. For example, an end user 100 can automatically and unilaterally provision computing resources and/or cloud applications/services, such as audio processing and licenses, as needed without requiring computing resources from a third party (e.g., a third party hardware).

In one embodiment, the cloud environment 200 implements one or more cloud service models, such as, but not limited to, Software as a Service (SaaS).

Figure 2:
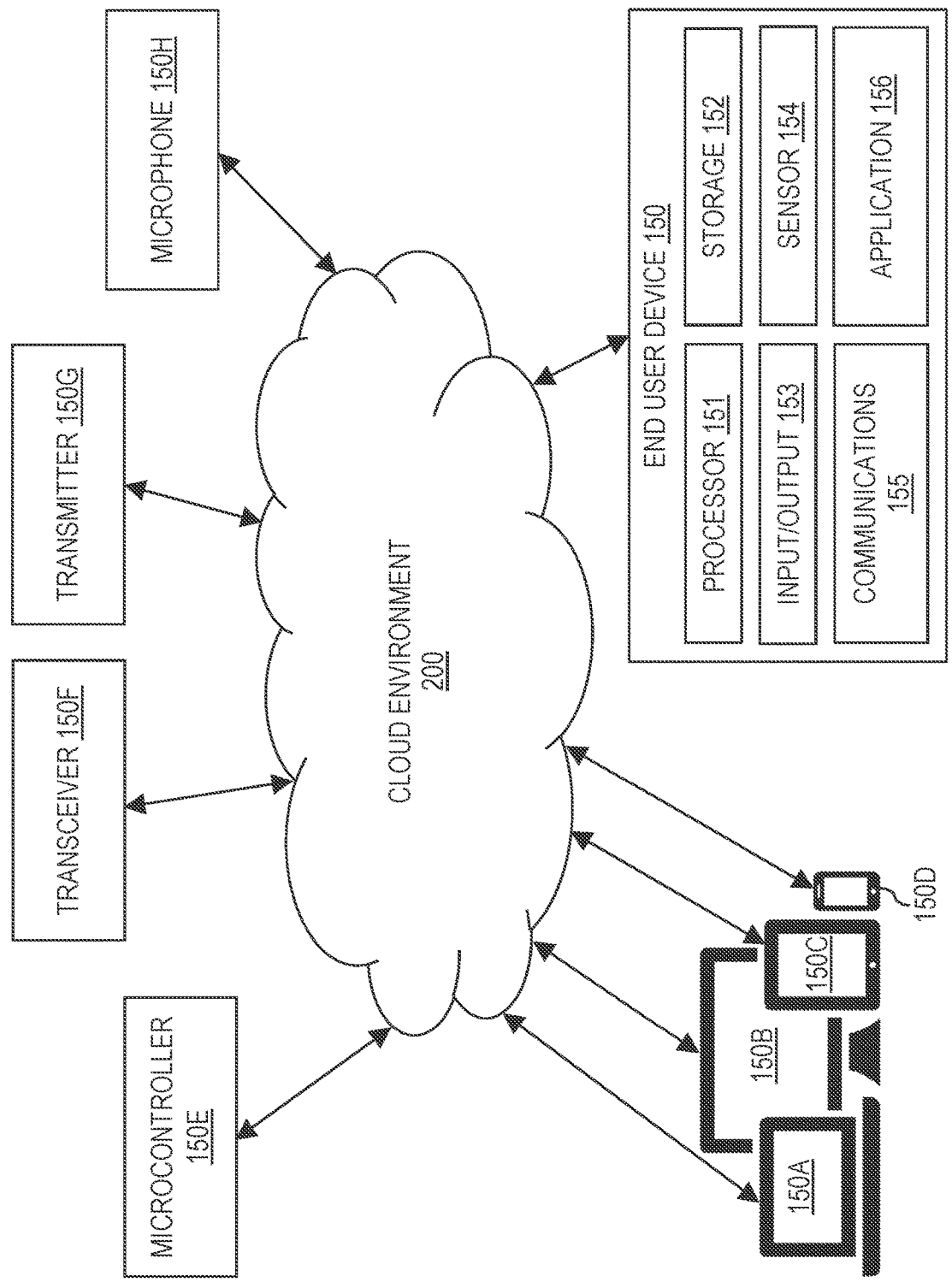
FIG. 2 illustrates different end user devices that an end user can use to communicate with the cloud environment, in accordance with one embodiment.

FIG. 2 illustrates different end user devices 150 that an end user 100 can use to communicate with the cloud environment 200, in accordance with one embodiment. An end user 100 can use one or more end user devices 150 to communicate with the cloud environment 200. In one embodiment, the one or more end user devices 150 include, but is not limited to, at least one of the following: a laptop computer 150A, a smart phone 150D, a tablet 150C, a wearable device (e.g., a smart watch), any other type of mobile electronic device; a desktop computer 150B; a smart appliance (e.g., a smart speaker, a smart television); an Internet of Things (IoT) device; professional audio equipment such as a microcontroller unit (MCU) 150E, a transceiver 150F, a transmitter 150G, a microphone 150H (e.g., a wireless microphone), any other type of professional audio equipment; professional audio systems such as wireless microphone systems, broadcast systems, public address systems, and other professional audio systems.

In one embodiment, an end user device 150 includes, but is not limited to, at least one of the following: a processor unit 151, a storage unit 152, a sensor unit 154 integrated in or coupled to the end user device 150 (e.g., a camera, a microphone, a GPS, a motion sensor, etc.), and an input/output (I/O) unit 153 integrated in or coupled to the end user device 150 (e.g., a physical user interface (PUI) and/or a graphical user interface (GUI), such as a keyboard, a keypad, a touch interface, a touch screen, a knob, a button, a display screen, etc.).

The computing nodes 20 of the cloud environment 200 can communicate with any type of end user device 150 over any type of network and/or network addressable connection. For example, in one embodiment, an end user device 150 comprises a communications unit 155 configured to exchange data with one or more of the computing nodes 20 over a communications network/connection (e.g., a wireless connection such as a Wi-Fi connection or a cellular data connection, a wired connection, or a combination of the two). The communications unit 155 may comprise any suitable communications circuitry operative to connect to a communications network and to exchange communications operations and media from the end user device 150 to other devices connected to the communications network. The communications unit 155 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, one or more applications 156 may execute/operate on an end user device 150, such as a desktop operating system and application, a mobile application, a web application, a virtual desktop and application, a companion application for a cloud application/service provided by the cloud environment 200, a cloud client configured to facilitate communication between the end user device 150 and one or more of the computing nodes 20, etc. Examples of a cloud client include, but are not limited to, a thin client, a terminal emulator, a web browser, a mobile application, etc.

In one embodiment, the cloud environment 200 maintains and distributes one or more upgrades/updates that are downloadable to an end user device 150 (e.g., a software update for professional audio software, a firmware upgrade for professional audio equipment).

In one embodiment, hardware and/or software of an end user device 150 is flexibly configured via one or more cloud applications/services of the cloud environment 200 to a job-specific or application-specific configuration necessary/required to execute a specific job or application (e.g., a particular audio project) that an end user 100 desires or demands. For example, if an end user 100 operates a system comprising one or more end user devices 150 (e.g., a wireless microphone system comprising one or more wireless microphones), hardware and/or software of each of the end user devices 150 is flexibly configurable, via the one or more cloud applications/services, to perform a particular job or application within the system for a particular duration/period of time. In one embodiment, flexible configuration of an end user device 150 involves adjusting one or more operational characteristics of the end user device 150, via the one or more cloud applications/services, to enhance or remove features of the end user device 150. For example, if an end user 100 requires additional audio channels for a particular audio project, one or more wireless microphones and/or other components of a wireless microphone system can be flexibly configured to access the additional audio channels during the duration of the audio project.

Figure 3:
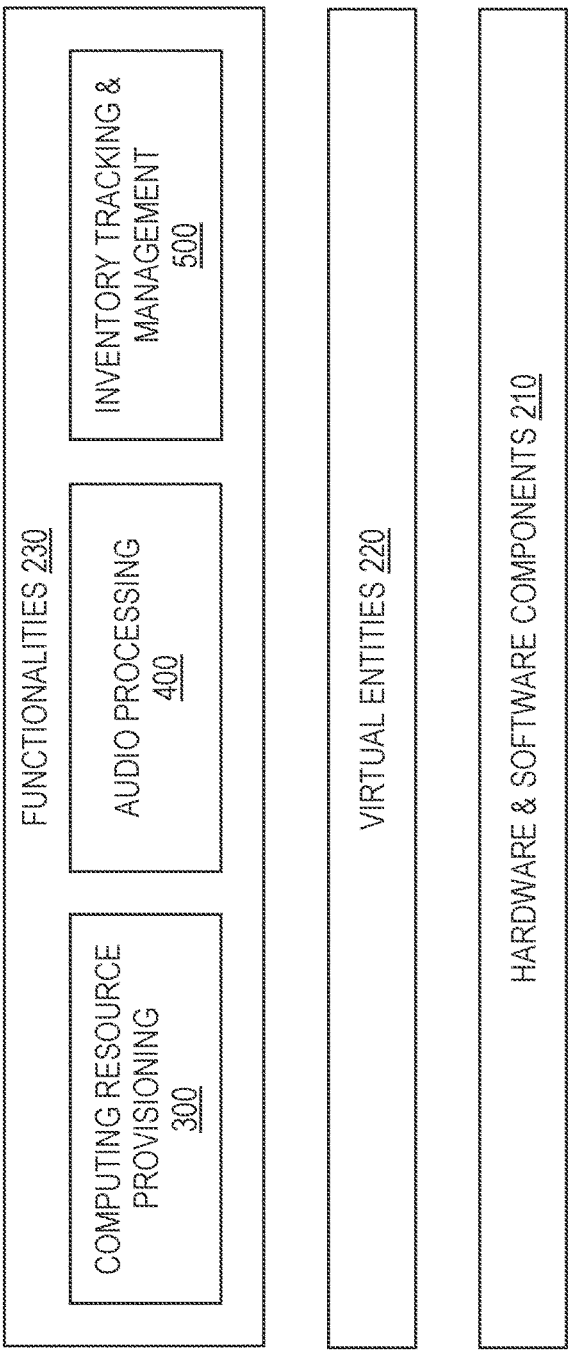
FIG. 3 illustrates different abstraction layers provided by computing resources of the cloud environment, in accordance with one embodiment.

FIG. 3 illustrates different abstraction layers provided by the computing resources of the cloud environment 200, in accordance with one embodiment.

In one embodiment, the computing resources of the cloud environment 200 provide an optional layer 210 of hardware and software components (i.e., hardware and software layer). The hardware and software components include, but are not limited to, at least one of the following: a mainframe computer 31 (FIG. 1), a reduced instruction set computer (RISC) based server 32 (FIG. 1), a blade server 34 (FIG. 1), any other type of server 33 (e.g., a complex instruction set computer (CISC) based server, rack-mounted server, etc.) (FIG. 1), a storage device 35 (FIG. 1), a network, a networking component, a Central Processing Unit (CPU), a microcontroller, a microprocessor, a Field Programmable Gate Array (FPGA), a database management system, an application server, a cloud application (e.g., an audio processing application), a license (e.g., a software license for a software product, such as license for access permission to particular audio channels, a license for an audio processing application; a hardware license for a device, such as professional audio equipment).

In one embodiment, the computing resources of the cloud environment 200 provide an optional layer 220 of virtual entities (i.e., virtualization layer). The virtual entities include, but are not limited to, at least one of the following: a virtual server, a virtual storage, a virtual network, a virtual application, a virtual operating system, and a virtual client.

In one embodiment, the computing resources of the cloud environment 200 provide one or more additional layers 230 of cloud applications/services. The cloud applications/services provide different functionalities. For example, in one embodiment, the cloud applications/services include, but are not limited to, at least one of the following: a computing resource provisioning system 300 configured for dynamic procurement of one or more computing resources of the cloud environment to perform one or more tasks for an end user 100 within the cloud environment 200, an audio processing system 400 configured for providing professional audio processing capabilities that an end user 100 can access on demand, and an inventory tracking and management system 500 configured for tracking and management of professional audio equipment inventory (e.g., MCUs 150E, transceivers 150F, transmitters 150G, wireless microphones 150H, licenses, etc.) of an end user 100.

It should be understood that the layers shown in FIG. 3 are intended to be illustrative only and embodiments of the invention are not limited thereto.

Figure 4:
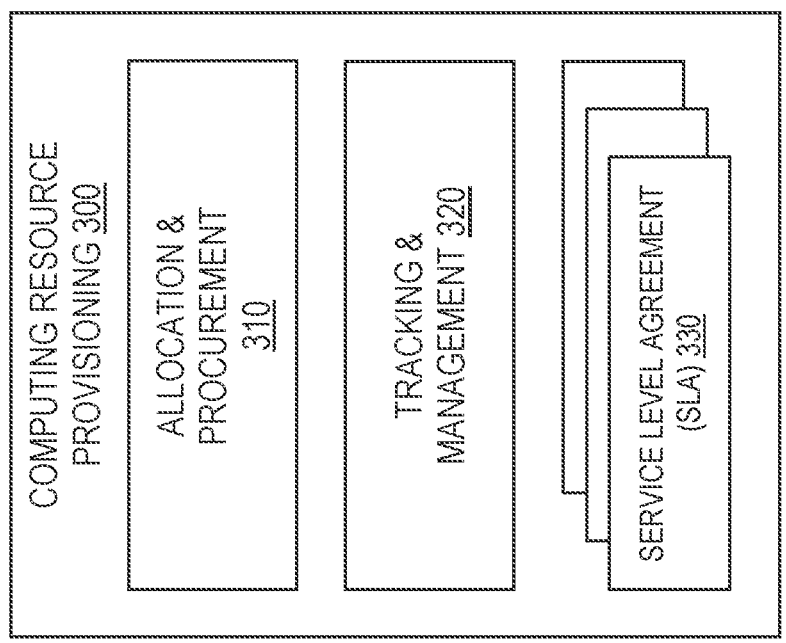
FIG. 4 illustrates an example computing resource provisioning system of the cloud environment, in accordance with one embodiment.

FIG. 4 illustrates an example computing resource provisioning system 300, in accordance with one embodiment. In one embodiment, the computing resource provisioning system 300 maintains a set of Service Level Agreements (SLA) 330, wherein each SLA 330 is an agreement between an end user 100 and a provider of the cloud environment 200 defining service levels that the provider is required to provide to the end user 100.

In one embodiment, the computing resource provisioning system 300 comprises an allocation and procurement unit 310 configured to allocate and manage computing resources of the cloud environment 200 for an end user 100. The allocation and procurement unit 310 is configured to coordinate pre-arrangement and procurement of computing resources for an end user 100 to satisfy a future requirement that is anticipated in accordance with a service level agreement (SLA) 330 between the end user 100 and the provider, such that required service levels are met.

In one embodiment, the computing resource provisioning system 300 comprises a tracking and management unit 320 configured to track costs relating to use of computing resources by an end user 100 within the cloud environment 200, and bill or invoice the end user 100 for consumption of these computing resources.

In one embodiment, the computing resources of the cloud environment 200 are pooled to serve multiple end users 100, with different physical and virtual computing resources dynamically assigned and reassigned based on demand. To an end user 100, capabilities available for provisioning often appear to be unlimited and can be purchased in any quantity at any time.

In one embodiment, the tracking and management unit 320 is configured to monitor workload resource consumption indicative of computing resource demands of an end user 100, and recommend one or more additional computing resources within the cloud environment 200 to the end user 100 based on the workload resource consumption.

The cloud environment 200 is a secure environment with controlled access. The cloud environment 200 provides a cost-efficient solution as it allows end users 100 to pay only for the computing resources they need and when they need them without having to expend a large amount of capital, manage/control the resources utilized, or purchase/rent more equipment than necessary, thereby saving time, resources, and money. The cloud environment 200 provides end users 100 with capacity to handle a new project; instead of investing in and setting up new systems, end users 100 can simply provision required computing resources from the cloud environment 200.

Figure 5:
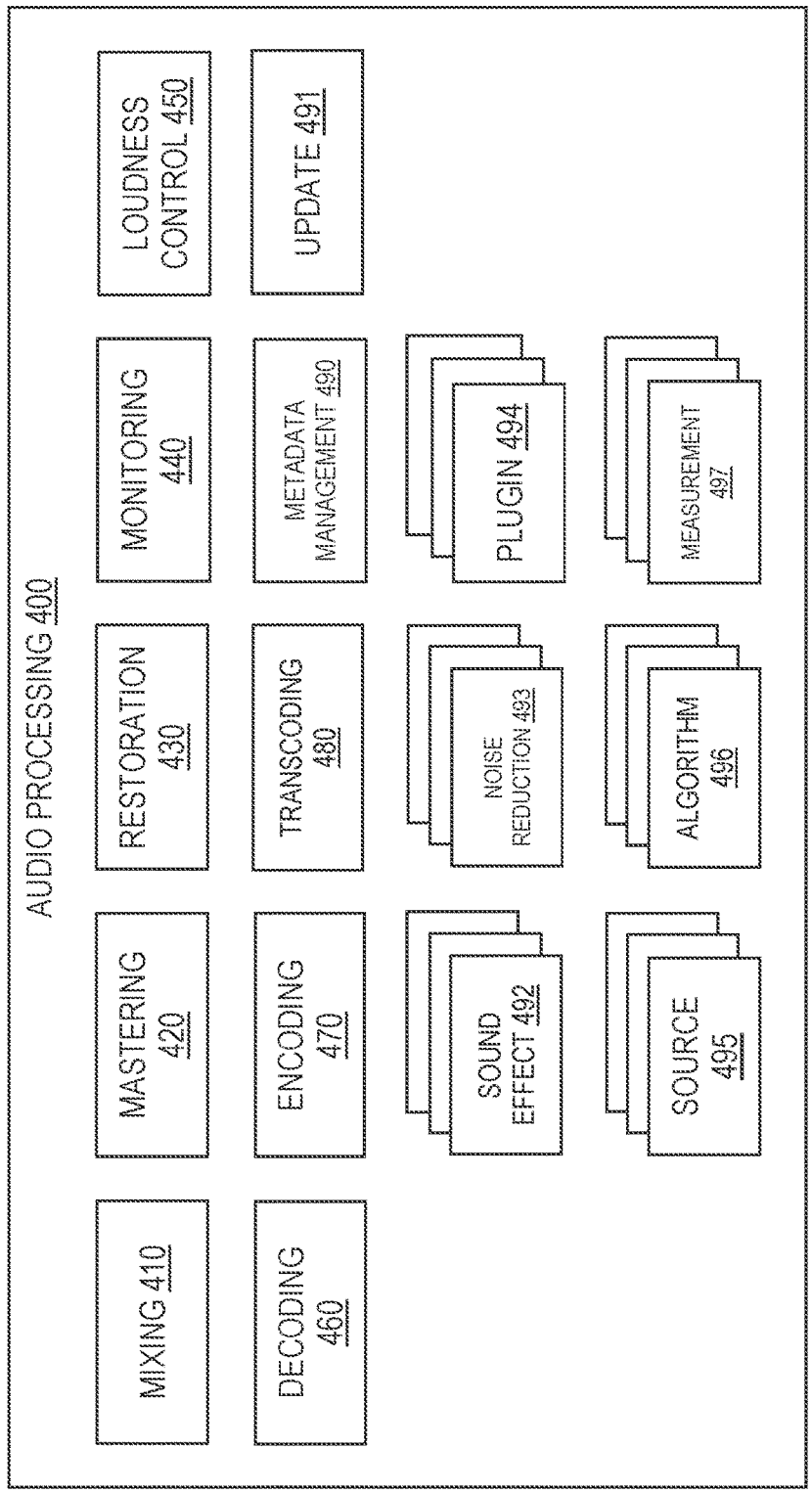
FIG. 5 illustrates an example audio processing system of the cloud environment, in accordance with one embodiment.

FIG. 5 illustrates an example audio processing system 400, in accordance with one embodiment. In one embodiment, the audio processing system 400 is configured to receive audio data from an end user 100 (e.g., audio data in any format uploaded to the cloud environment 200 from an end user device 150) and apply one or more professional-grade audio processing functionalities to the audio data. The resulting processed audio data may be sent back to the end user 100 (e.g., downloaded to the same end user device 150 or a different end user device 150), to a different end user 100, or hosted online for distribution/streaming. The audio processing system 400 offers an audio processing and production platform that provides end users 100 with efficient and automated audio processing and production tools, allowing them the freedom and flexibility to select audio processing and production products suitable for their projects.

In one embodiment, the audio processing system 400 comprises, but is not limited to, at least one of the following audio processing and production components: an audio mixing unit 410 for mixing audio data, an audio mastering application 420 for mastering audio data, an audio restoration unit 430 for restoration of audio data, an audio monitoring unit 440 for monitoring audio data, a loudness control unit 450 for controlling loudness of audio data, an audio decoding unit 460 for decoding encoded audio data, an audio encoding unit 470 for encoding unencoded audio data, an audio transcoding unit 480 for transcoding encoded audio data from one form of coded representation to another, and a metadata management unit 490 for managing metadata associated with audio data.

In one embodiment, the audio processing system 400 comprises one or more indexed libraries for storing, sharing, and accessing. For example, in one embodiment, the audio processing system 400 comprises, but is not limited to, at least one of the following: one or more audio suites 492 for sound effects, one or more audio suites 493 for noise reduction/noise suppression/noise cancellation, one or more libraries 494 of other types of audio plugins, one or more audio libraries 495 of audio sources, one or more audio libraries 496 of audio processing algorithms (e.g., filtering, equalization, dynamic range control, reverberation, etc.), and one or more audio libraries 497 of audio-related measurements. An audio processing and production component of the audio processing system 400 can utilize any of these libraries.

In one embodiment, the audio processing system 400 comprises an update unit 491 for distributing one or more updates/upgrades to one or more end user devices 150 to enhance one or more features of the end user devices 150 (e.g., an updated audio plugin, a firmware upgrade, a software update for a companion app, etc.).

Figure 6:
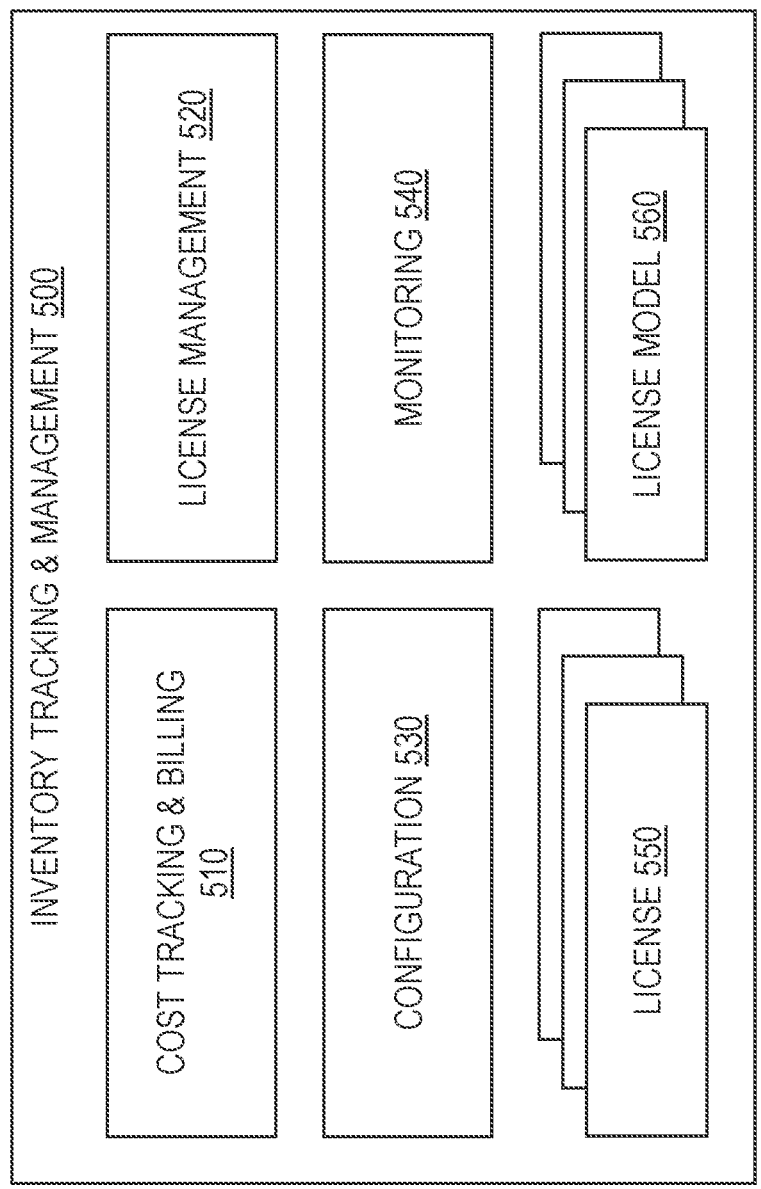
FIG. 6 illustrates an example inventory tracking and management system of the cloud environment, in accordance with one embodiment.

FIG. 6 illustrates an example inventory tracking and management system 500, in accordance with one embodiment. In one embodiment, the inventory tracking and management system 500 comprises a cost tracking and billing unit 510 configured to track costs relating to use of professional audio products (e.g., job-specific or application-specific devices created by flexibly configuring end user devices 150 to execute specific jobs or applications, audio processing and production tools provided by the audio processing system 400, licenses, professional audio processing and production software and companion apps downloaded to end user devices 150, professional audio equipment, etc.) by an end user 100, and bill or invoice the end user 100 for consumption of these products.

In one embodiment, the inventory tracking and management system 500 comprises a license management unit 520 configured to provision one or more licenses 550 for one or more professional audio products to an end user 100, and control usage of the one or more licenses 550 by the end user 100, providing transparency for both a provider of the professional audio products (e.g., a professional audio equipment rental company) and the end user 100 (e.g., a recording studio renting professional audio equipment). The license management unit 520 is configured to provision one or more licenses 550 for one or more professional audio products to an end user 100 that are necessary to perform a specific job or application (e.g., a particular audio project) that the end user 100 desires or demands. For example, in one embodiment, the license management unit 520 is configured to provide software licenses for a suite of professional-grade audio processing capabilities offered by the audio processing system 400, licenses for specific hardware configurations of flexibly configurable end user devices 150 to execute specific jobs/applications, licenses for specific software configurations of flexibly configurable end user devices 150 to execute specific jobs/applications, etc. For example, in one embodiment, the license management unit 520 allows an end user 100 to shift a license provisioned to the end user 100 between different end user devices 150, or even sub-license to another end user 100.

In one embodiment, the inventory tracking and management system 500 comprises a monitoring unit 540 configured to monitor usage of one or more professional audio products by an end user 100, and recommend one or more additional professional audio products (e.g., a particular software license) to the end user 100 based on the usage.

In one embodiment, the inventory tracking and management system 500 is configured to implement different license models 560. For example, in one embodiment, the inventory tracking and management system 500 implements a per use license model with flexible deployment and pricing options, allowing end users 100 to conveniently and quickly deploy capabilities they require on a per project basis, such that the end users 100 are billed or invoiced per use.

In one embodiment, the inventory tracking and management system 500 comprises a configuration unit 530 configured to create a job-specific or application-specific device/system component by flexibly configuring an end user device 150 to execute a specific job or application. Specifically, the configuration unit 530 is configured to flexibly configure hardware and/or software of an end user device 150 to a job-specific or application-specific configuration necessary/required to execute a specific job or application that an end user 100 desires or demands. In one embodiment, the configuration unit 530 is configured to create a job-specific or application-specific device/system component by adjusting one or more operational characteristics of a professional audio product (e.g., operational characteristics of associated hardware and/or software components) based on one or more licenses provisioned to an end user 100 (e.g., via the license management unit 520) to execute a specific job or application, where the adjustment enhances or removes features of the product.

For example, in one embodiment, the configuration unit 530 is configured to adjust one or more access permissions to one or more audio channels and/or professional audio equipment. An end user 100 can customize their end user devices 150 to suit their demand. For example, if the end user 100 requires for more audio channels or more professional-grade audio processing capabilities, the end user 100 can easily incorporate additional professional-grade audio processing functionalities or increase their audio channel count via the cloud environment 200. For example, if the end user 100 has a license with restrictions (e.g., geographic restrictions, timing restrictions, etc.), the inventory tracking and management system 500 can implement such restrictions based on contextual data relating to the end user 100 (e.g., geolocation data and other contextual data captured by one or more sensor units 154 of one or more end user devices 150 of the end user 100).

In one embodiment, the monitoring unit 540 is configured to track and manage usage of one or more job-specific or application-specific devices/system components (i.e., a specific devices/system components that have been flexibly configured to perform a specific job or application via the configuration unit 530). Specifically, the monitoring unit 540 is configured to receive data from one or more job-specific or application-specific devices/system components, and monitor, record, and report usage time of the devices/system components based on the data. In one embodiment, data received from a job-specific or application-specific device/system component comprises, but is not limited to, at least one of audio, configuration state of the device/system component, one or more control signals associated with the device/system component (e.g., information indicative of one or more features that an end user 100 desires to add or remove from the device/system component, information indicative of when the end user 100 starts or stops execution of a specific job or application, etc.), one or more performance signals associated with the device/system component (e.g., information indicative of technical quality of data communications/transmissions between the device/system component and the cloud environment 200 or other devices, such as response time, loss, signal-to-noise ratio, cross-talk, echo, interrupts, bit rate, loudness levels, frequency response, frame rate, and codec, etc.), location status of the device/system component (e.g., geolocation information captured by one or more sensor units 154 and indicative of a current location of the device/component), and time status of the device/component (contextual information captured by one or more sensor units 154 and indicative of a current time at the device/component, duration of time remaining for a specific job or application that the device/component is flexibly configured to execute, etc.).

The cost tracking and billing unit 510 is configured to bill or invoice an end user 100 for usage of one or more job-specific or application-specific devices/system components based on usage time of the devices/system components (e.g., usage time monitored and recorded by the monitoring unit 540). The inventory tracking and management system 500 provides a cost-efficient solution as it allows end users 100 to pay only for features/enhancements that job-specific or application-specific devices/system components have been flexibly configured to provide to perform a specific job or application, without having to expend a large amount of capital or purchase/rent more equipment than necessary, thereby saving time, resources, and money. The inventory tracking and management system 500 provides end users 100 with capacity to handle new projects and different types of projects; instead of investing in and setting up new systems, end users 100 can simply provision different device configurations for their end user devices 150 from the inventory tracking and management system 500. Flexible configuration allows an end user 100 to cost-effectively customize/tailor a hardware and/or software configuration of an end user device 150 to increase/decrease its capabilities/functionalities to suit their needs/demands.

Figure 7:
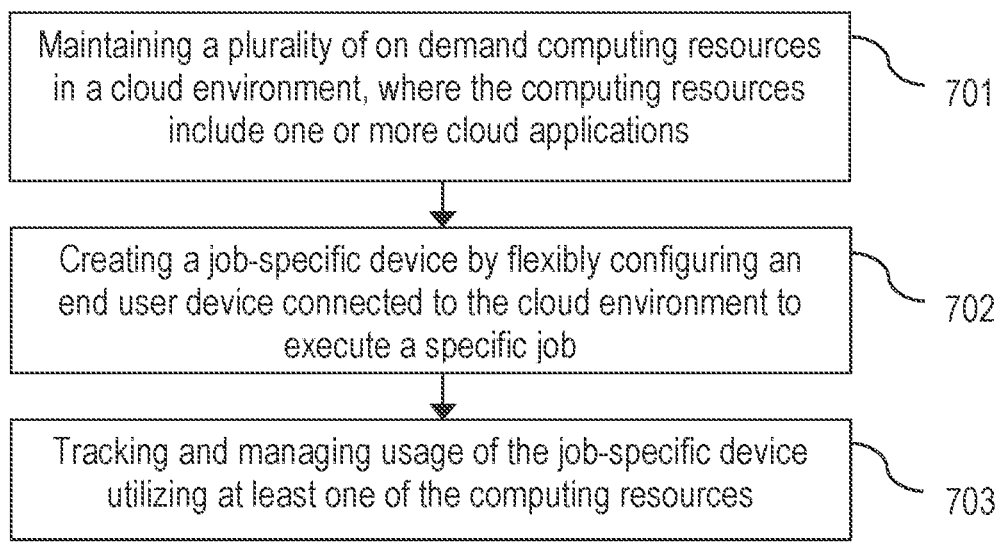
FIG. 7 illustrates a flowchart of an example process for audio processing and inventory tracking and management in a cloud environment, in accordance with one embodiment.

FIG. 7 illustrates a flowchart of an example process 700 for inventory tracking and management in a cloud environment, in accordance with one embodiment. Process block 701 includes maintaining a plurality of on demand computing resources in the cloud environment, where the computing resources include one or more cloud applications. Process block 702 includes creating a job-specific device by flexibly configuring an end user device connected to the cloud environment to execute a specific job. Process block 703 includes tracking and managing usage of the job-specific device utilizing at least one of the computing resources.

In one embodiment, process blocks 701-703 may be performed utilizing one or more components of the cloud environment 200, such as the inventory tracking and management system 500.

Figure 8:
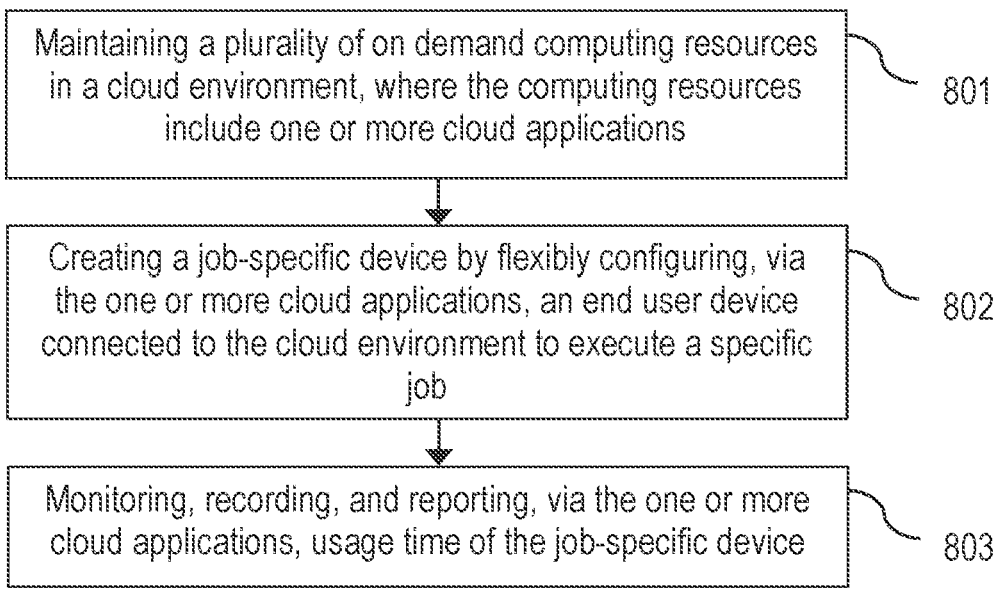
FIG. 8 illustrates a flowchart of an example process for flexible device configuration in a cloud environment, in accordance with one embodiment.

FIG. 8 illustrates a flowchart of an example process 800 for flexible device configuration in a cloud environment, in accordance with one embodiment. Process block 801 includes maintaining a plurality of on demand computing resources in the cloud environment, where the computing resources include one or more cloud applications. Process block 802 includes creating a job-specific device by flexibly configuring, via the one or more cloud applications, an end user device connected to the cloud environment to execute a specific job. Process block 803 includes monitoring, recording, and reporting, via the one or more cloud applications, usage time of the job-specific device.

In one embodiment, process blocks 801-803 may be performed utilizing one or more components of the cloud environment 200, such as the inventory tracking and management system 500.

Figure 9:
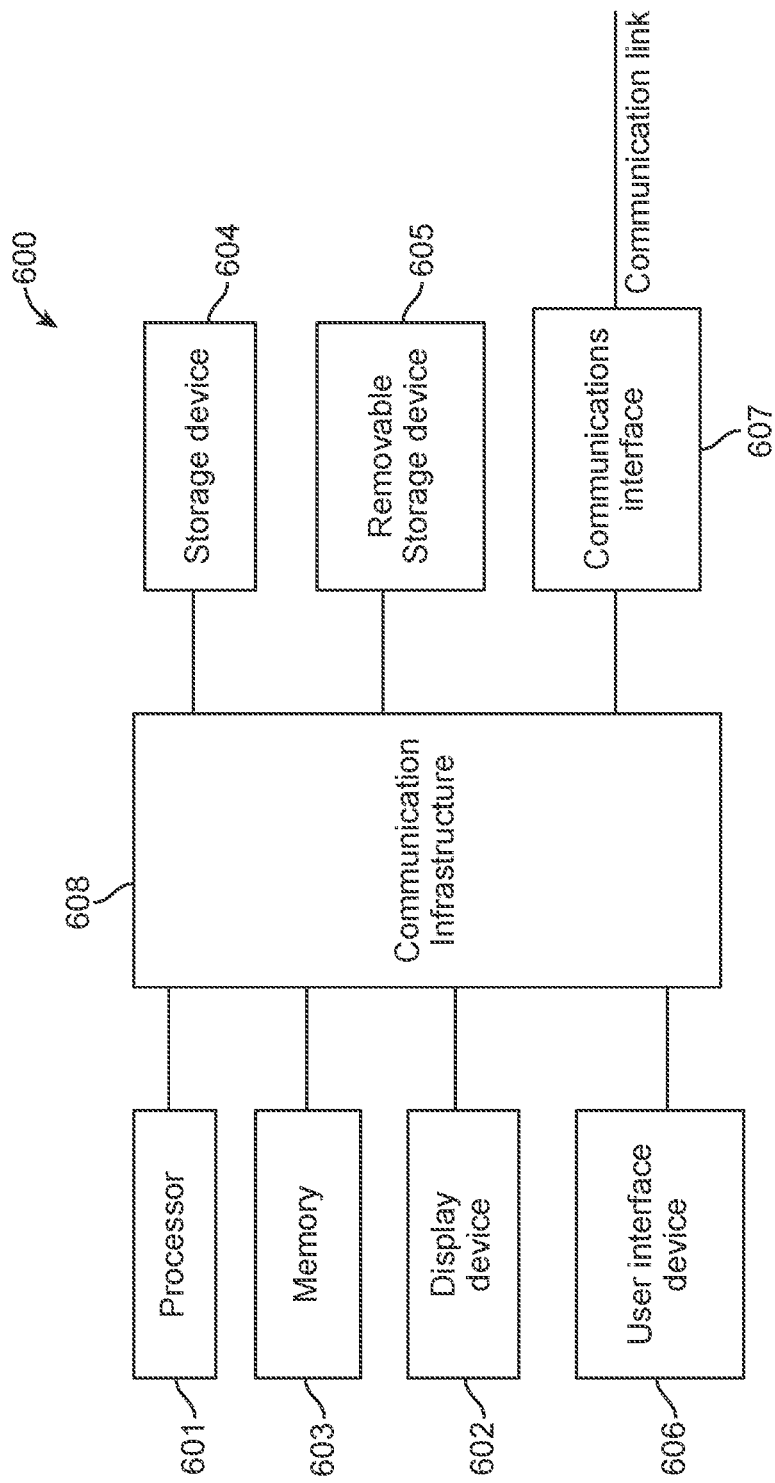
FIG. 9 is a high-level block diagram showing an information processing system comprising a computer system useful for implementing the disclosed embodiments.

FIG. 9 is a high-level block diagram showing an information processing system comprising a computer system 600 useful for implementing the disclosed embodiments. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), user interface device 606 (e.g., keyboard, touch screen, keypad, pointing device), and a communication interface 607 (e.g., modem, a network interface (such as an Ethernet card), a communications port, or a PCMCIA slot and card). The main memory 603 may store instructions that when executed by the one or more processors 601 cause the one or more processors 601 to perform one or more process blocks of the process 700 and the process 800.

The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process. In one embodiment, processing instructions for one or more process blocks of process 700 (FIG. 7) and process 800 (FIG. 8) may be stored as program instructions on the memory 603, storage device 604 and the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A system for inventory tracking and management in a cloud environment, comprising:
 a plurality of on demand computing resources maintained in the cloud environment, wherein the computing resources include one or more cloud applications;
 at least one processor; and
 a non-transitory processor-readable memory device storing instructions that when executed by the at least one processor causes the at least one processor to perform operations including:
  customizing an end user device connected to the cloud environment to execute a specific job on the end user device that an end user desires by:
   provisioning a license to the end user for one or more functionalities required on the end user device to execute the specific job on the end user device, wherein the end user device comprises a wireless microphone, and the one or more functionalities comprise one or more access permissions to one or more audio channels on the wireless microphone; and
   configuring the end user device to provide the one or more functionalities on the end user device by adjusting, via the one or more cloud applications, one or more operational characteristics of at least one of hardware or software of the end user device based on the license, wherein a number of audio channels available for access on the wireless microphone is adjusted in response to the configuring; and
  ensuring usage of the one or more functionalities on the end user device is in compliance with the license by tracking and managing the usage of the one or more functionalities on the end user device utilizing at least one of the computing resources.

2. The system of claim 1, wherein the customizing the end user device further comprises:
 receiving data from the end user device, wherein the data comprises a geolocation of the end user device, wherein the data further comprises at least one of audio, configuration state of the end user device, one or more control signals associated with the end user device, one or more performance signals associated with the end user device, time at the end user device, and duration of time remaining to execute the specific job on the end user device, and wherein the provisioning the license to the end user is based on the data.

3. The system of claim 2, wherein the tracking and managing the usage of the one or more functionalities on the end user device comprises:
 monitoring, recording, and reporting usage time of the one or more functionalities on the end user device based on the data.

4. The system of claim 3, wherein the operations further comprise:
 billing the end user for the usage of the end user device based on the usage time.

5. The system of claim 1, wherein the end user device comprises a flexibly configurable wireless microphone system including the wireless microphone, and the configuring the end user device to provide the one or more functionalities on the end user device comprises adding one or more additional audio channels on the wireless microphone.

6. The system of claim 2, wherein:
 the one or more cloud applications are configured to apply one or more professional-grade audio processing techniques; and
 the operations further comprise:
  processing audio included in the data utilizing the one or more cloud applications; and
  returning the processed audio to at least one of the end user device or another end user device connected to the cloud environment.

7. The system of claim 2, wherein the operations further comprise:
 provisioning one or more licenses to the end user for one or more professional audio products required to execute the specific job; and
 monitoring and controlling usage of the one or more professional audio products based on the one or more licenses.

8. The system of claim 7, wherein the one or more licenses comprise at least one of a license for the one or more cloud applications, a license for a professional audio equipment, a license for a specific hardware configuration of the end user device to execute the specific job, a license for a specific software configuration of the end user device to execute the specific job, and a license for a professional audio processing software.

9. The system of claim 7, wherein the operations further comprise:
 billing the end user based on the usage of the one or more professional audio products and a license model.

10. The system of claim 7, wherein the operations further comprise:

generating one or more recommendations for the end user based on the usage of the one or more professional audio products.

11. The system of claim 7, wherein the operations further comprise:
adjusting one or more operational characteristics of the one or more professional audio products based on the one or more licenses.

12. The system of claim 6, wherein the professional-grade audio processing techniques include at least one of mixing, mastering, restoration, monitoring, loudness control, decoding, encoding, transcoding unit, and managing metadata.

13. The system of claim 6, wherein the computing resources further comprise at least one of an audio suite for sound effects, an audio suite for noise reduction, a library of audio plugins, a library of audio sources, a library of audio processing algorithms, and a library of audio-related measurements.

14. A method for inventory tracking and management in a cloud environment, comprising:
maintaining a plurality of on demand computing resources in the cloud environment, wherein the computing resources include one or more cloud applications;
customizing an end user device connected to the cloud environment to execute a specific job on the end user device that an end user desires by:
provisioning a license to the end user for one or more functionalities required on the end user device to execute the specific job on the end user device, wherein the end user device comprises a wireless microphone, and the one or more functionalities comprise one or more access permissions to one or more audio channels on the wireless microphone; and
configuring the end user device to provide the one or more functionalities on the end user device by adjusting, via the one or more cloud applications, one or more operational characteristics of at least one of hardware or software of the end user device based on the license, wherein a number of audio channels available for access on the wireless microphone is adjusted in response to the configuring; and
ensuring usage of the one or more functionalities on the end user device is in compliance with the license by tracking and managing the usage of the one or more functionalities on the end user device utilizing at least one of the computing resources.

15. The method of claim 14, wherein the customizing the end user device further comprises:
receiving data from the end user device, wherein the data comprises a geolocation of the end user device, wherein the data further comprises at least one of audio, configuration state of the end user device, one or more control signals associated with the end user device, one or more performance signals associated with the end user device, time at the end user device, and duration of time remaining to execute the specific job on the end user device, and wherein the provisioning the license to the end user is based on the data.

16. The method of claim 15, wherein the tracking and managing the usage of the one or more functionalities on the end user device comprises:
monitoring, recording, and reporting usage time of the one or more functionalities on the end user device based on the data.

17. The method of claim 14, wherein the end user device comprises a flexibly configurable wireless microphone system including the wireless microphone, and the configuring the end user device to provide the one or more functionalities on the end user device comprises adding one or more additional audio channels on the wireless microphone.

18. A method for flexible device configuration in a cloud environment, comprising:
maintaining a plurality of on demand computing resources in the cloud environment, wherein the computing resources include one or more cloud applications;
customizing an end user device connected to the cloud environment to execute a specific job on the end user device that an end user desires by:
provisioning a license to the end user for one or more functionalities required on the end user device to execute the specific job on the end user device, wherein the end user device comprises a wireless microphone, and the one or more functionalities comprise one or more access permissions to one or more audio channels on the wireless microphone; and
configuring the end user device to provide the one or more functionalities on the end user device by adjusting, via the one or more cloud applications, one or more operational characteristics of at least one of hardware or software of the end user device based on the license, wherein a number of audio channels available for access on the wireless microphone is adjusted in response to the configuring; and
ensuring usage of the one or more functionalities on the end user device is in compliance with the license by monitoring, recording, and reporting usage time of the one or more functionalities on the end user device utilizing at least one of the computing resources.

* * * * *